United States Patent [19]

Leas et al.

[11] Patent Number: 4,498,290
[45] Date of Patent: Feb. 12, 1985

[54] ROTARY ENGINE

[76] Inventors: Arnold M. Leas, 122 N. 34th St., Towne House Village, Richmond, Ind. 47374; Lawrence E. Leas, 1482 Sinaloa Rd., Simi Valley, Calif. 93065

[21] Appl. No.: 279,120

[22] Filed: Jun. 30, 1981

Related U.S. Application Data

[62] Division of Ser. No. 91,919, Nov. 6, 1979, abandoned.

[51] Int. Cl.³ .............................. F02C 3/14; F02C 3/20
[52] U.S. Cl. ..................................... 60/39.55; 60/723
[58] Field of Search .................... 60/39.05, 39.55, 723, 60/39.53, 39.5, 39.461

[56] References Cited

U.S. PATENT DOCUMENTS

| | | | |
|---|---|---|---|
| 3,846,979 | 11/1974 | Pfefferle | 60/723 |
| 3,978,661 | 9/1976 | Cheng | 60/39.55 |
| 4,041,699 | 8/1977 | Schelp | 60/39.55 |

Primary Examiner—Louis J. Casaregola
Attorney, Agent, or Firm—John J. Byrne; Bradford E. Kile; Kevin M. O'Brien

[57] ABSTRACT

Disclosed are an engine system suitable for use with methyl alcohol and hydrogen and a rotary engine particularly suited for use in the engine system. The rotary engine comprises a stator housing having a plurality of radially directed chamber dividers, a principal rotor, a plurality of subordinate rotors each having an involute gear in its periphery mounted on the principal rotor, and means for rotating the subordinate rotors so that their involute gears accept the radially directed dividers as the subordinate rotors move past them.

5 Claims, 5 Drawing Figures

ROTARY ENGINE

This is a division of U.S. patent application Ser. No. 06/091,919, filed Nov. 6, 1979, now abandoned.

TECHNICAL FIELD

This invention relates to internal combustion engines. In particular, it relates to rotary engines developed for use with non-petroleum fuel.

BACKGROUND OF PRIOR ART

In the prior art, engine thermal efficiency and environmental emissions were not paramount considerations. Internal combustion engines required a very highly refined petroleum gasoline or diesel fuel made from many thousands of chemical compounds. For most internal combustion engines, cooling water or air was required because of their very low thermal efficiencies. High combustion temperatures and poor control of air-fuel ratios caused excessive toxic exhaust emissions for both starting and idling operations. Additionally, use of the highly refined petroleum fuels entailed high costs for lengthy transportation between crude oil sources and giant refineries, and for local distribution and storage.

The problems suggested in the preceding are not intended to be exhaustive, but rather are among many which tend to reduce the effectiveness of prior internal combustion engines. Other noteworthy problems may also exist; however, those presented above should be sufficient to demonstrate that internal combustion engines appearing in the prior art have not been altogether satisfactory.

OBJECT OF THE INVENTION

Since America is now at the threshold of much higher cost for clean energy for all applications, a new engine is required to meet the challenge of the decades ahead. The primary object of the present invention is to contribute to the realization of a more efficient compact engine to assure the continuity of dependable American clean energy.

It is a further object of the present invention to overcome or mitigate the inadequacies and serious problems of prior art internal combustion engines, described above.

It is another object of the present invention to dual-fuel a novel rotary engine with methyl alcohol for normal driving and bottled hydrogen for engine starting and for engine idling operations.

It is yet another object of the present invention to recycle condensed steam from the exhaust gases to heat recovery exchangers and then to recycle steam from the heat recovery exchangers to a combustor to control fuel combustion temperatures from 1000° F. to 2000° F.

It is yet a further object of the present invention to use a stable metal oxide fixed-bed reagent in the combustor to better control air-fuel ratios with less excess air requirements and also to realize virtually complete fuel combustion at all times.

Yet another object of the present invention is to use some hydrogen gas to pressure methyl alcohol fuel into the combustor.

Yet a further object of the present invention is to eliminate the need for engine cooling water.

Still another object of the present invention is to increase the engine's thermal efficiency.

Other objects and advantages of the present invention will become apparent from the following detailed description of a preferred embodiment thereof taken in conjunction with the accompanying drawings.

BRIEF SUMMARY OF THE INVENTION

The present invention involves a more efficient rotary engine that is dual-fueled with methyl alcohol for normal driving and bottled hydrogen for starting and idling operations. The hydrogen gas pressures the methyl alcohol into an external combustor to eliminate the need for a fuel injection pump. A stable metal oxide reagent, in the form of a fluid bed in the chemical combustor, provides most of the battery stored power. Additionally the metal oxide stabilizes control of the air-fuel ratio closer to stoichiometric requirements.

To control the combustor temperature between 1000° F. and 2000° F., which is the optimum range, recycle exhaust steam condensate is recycled through exhaust gas indirect heat exchangers, after which it is recycled as steam to the combustor. This control virtually eliminates nitrogen oxide emissions to the atmosphere. Similarly, the excess hot solid oxygen stored in the metal oxide contact reagent insures virtually complete fuel combustion at all times. Because of the above factors, cooling water is not required for this engine configuration.

DETAILED DESCRIPTION OF THE PRESENTLY PREFERRED EMBODIMENT

The Engine System

Figure 1:
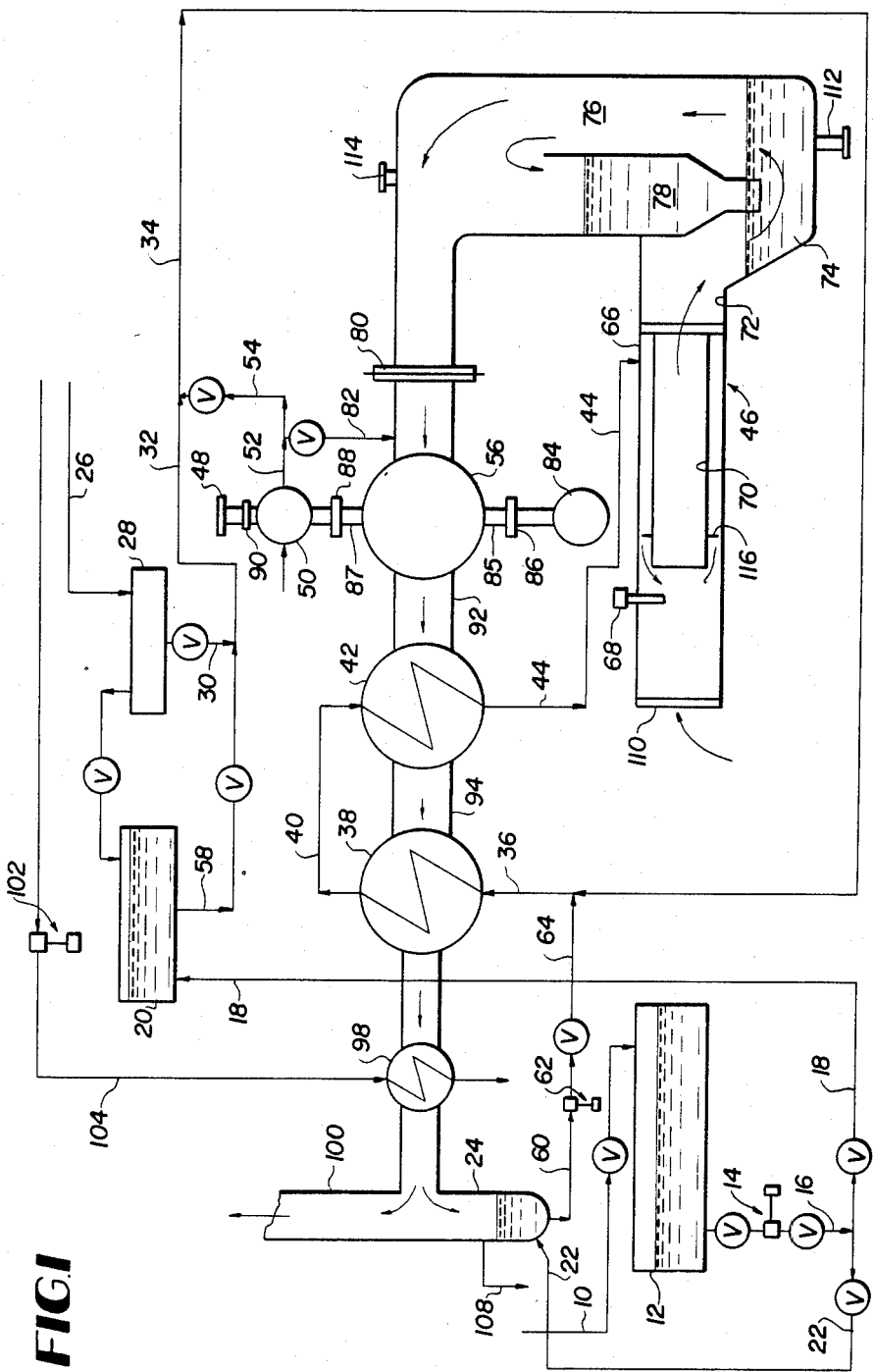
FIG. 1 is a schematic drawing of an engine system according to the subject invention.
Figure 2:
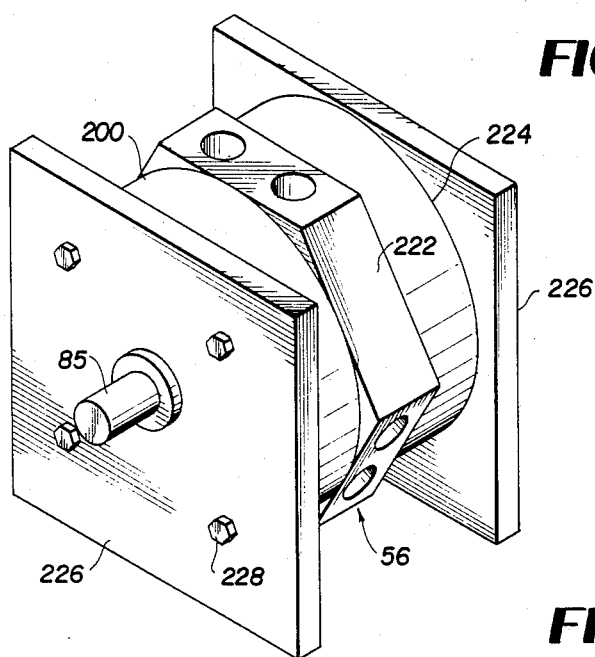
FIG. 2 is a perspective view of a rotary engine according to the subject invention.
Figure 3:
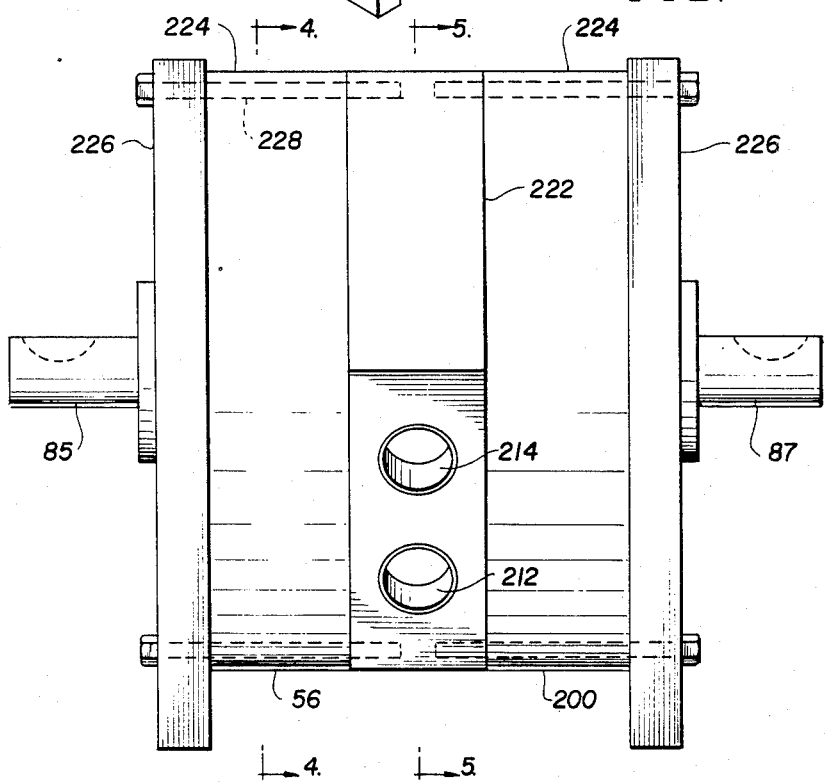
FIG. 3 is a side view of the rotary engine shown in FIG. 2.

The subject invention is illustrated in the context of an engine system suitable for use in an automobile. However, it is clearly not limited to such use, or even to use in connection with transportation.

In the illustrated embodiment methyl alcohol from an external source (not shown), such as a filling station pump, is pressured via line 10 to a methyl alcohol tank 12. A transfer pump 14 moves the methyl alcohol via lines 16 and 18 to a process pressure tank 20. In cold climates, a very small amount of the methyl alcohol is bled via lines 16 and 22 to an exhaust water reservoir 24.

Hydrogen from an external source (not shown), such as a filling station pump, is pressured via line 26 to a hydrogen tank 28. During engine starting and engine idling operations, a small amount of hydrogen is allowed to pressure via lines 30, 32, 34, and 36, heat exchanger 38, line 40, heat exchanger 42, and line 44 to a combustor chamber 46. Likewise, air from a starting motor 48 is pressured by air compressor 50 via lines 52, 54, 34, and 36, heat exchanger 38, line 40, heat exchanger 42, and line 44 to the combustor chamber 46.

In normal operation, a gas expander in the form of a rotary engine 56 (described in detail hereinafter) drives the air compressor 50 to supply a controlled amount of air. Methyl alcohol exiting methyl alcohol tank 20 via line 58, hydrogen exiting hydrogen tank 28 via line 30, air exiting the air compressor 50 via lines 52 and 54, and recycle steam condensate exiting the exhaust water reservoir 24 via line 60, pump 62, and line 64 join in line 36, after which they flow through the tube sides of heat exchangers 38 and 42 and are vaporized. The mixed vapor flows through line 44 to a superheated annular space 66 within the combustion chamber 46.

The fuel-air vapor in the combustion chamber 46 is ignited by a spark plug 68. The burned fuel pressures via heat exchanger central duct 70 to a second combustor section 72. Powdered oxidized stainless steel 74 functions as a final combustor for the residual fuel elements to assure complete combustion. The high velocity of the burned fuel and steam fluidizes the powdered stainless steel 74 and pressures it through duct 76 to recycle through accumulator 78.

The completely burned fuel and superheated steam, which is in the temperature range of 1800° F. to 2000° F., pressures via filter 80 to the gas expander 56. Quench air supplied by the compressor 50 via lines 52 and 82 controls the burned gas mixture to about 1700° F. prior to entering the gas expander 56.

The gas expander 56 drives both a power drive shaft 84 via power take-off shaft 85 and a variable clutch 86 and the air compressor 50 via a power take-off shaft 87 and a variable clutch 88. During normal operations, a variable clutch 90 disengages the starting motor 48 from the air compressor 50 and gas expander 56.

The exhaust gas from the gas expander 56 flows via duct 92 to the shell side of heat exchanger 42, via duct 94 to the shell side of heat exchanger 38, via duct 96 to the shell side of a heat exchanger 98, and via duct 100 to atmosphere. An air blower 102 forces external clean air through a line 104, the tube side of heat exchanger 98, and a line 106 for space heating. The steam condensate in the exhaust gases collects in exhaust water reservoir 24. As previously mentioned, this water is pressured via line 60, pump 62, and line 64 as recycle to the combustor chamber 46. The product condensed water overflows to the atmosphere via duct 108.

Some of the auxiliary features of the engine system schematically illustrated in the drawing are a combustor chamber clean-out flange 110, a cleaning plug 112, a reagent fill line 114, and support orifices 116.

The Rotary Engine

The rotary engine illustrated in FIGS. 2 through 5 comprises a stator housing 200 having an internal cylindrical chamber 202, a plurality of radially directed chamber dividers 204 projecting from the inner wall of the stator housing 200 by a uniform amount, a principal rotor 206 coaxially mounted in the cylindrical chamber 202 for rotation therewithin, a plurality of subordinate rotors 208 mounted in the principal rotor 206 for rotation about axes parallel to the axis of the principal rotor 206, means 210 (shown in FIG. 4 and described in detail hereinafter)for rotating the subordinate rotors 208, inlets 212, and outlets 214.

Figure 5:
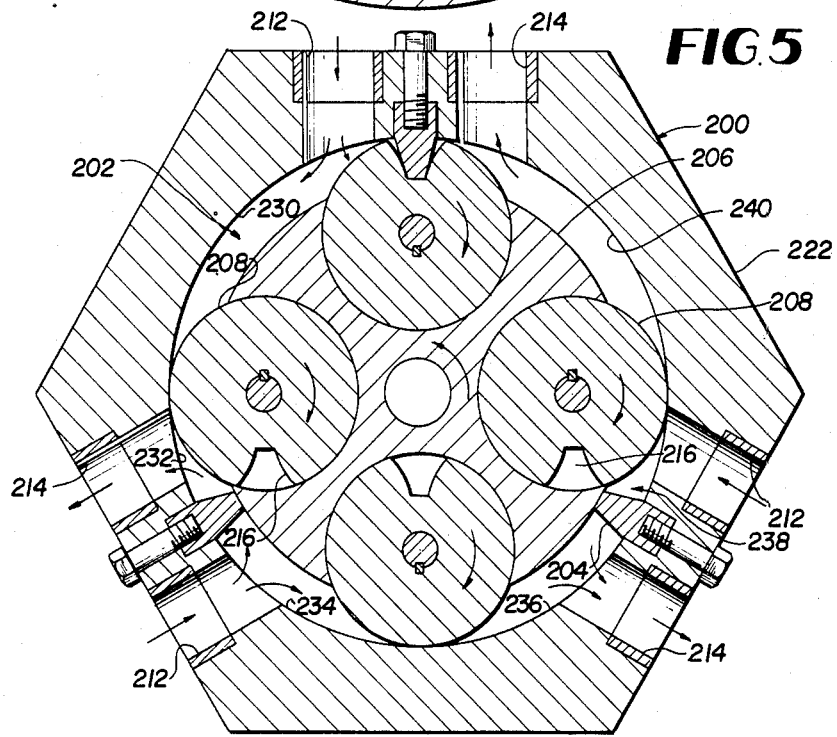
FIG. 5 is a view along the line 5—5 in FIG. 3.

As best seen in FIG. 5, the principal rotor 206 has an external diameter such that its outer surface makes sealing contact with the plurality of radially directed chamber dividers. Similarly, the subordinate rotors 208 project through the principal rotor 206 by an amount such that their outer surfaces make sealing contact with the inner cylindrical surface of the stator housing 200. Additionally, each subordinate rotor has an involute gear 216 in its periphery sized and shaped to accept the chamber dividers 204 in sealing contact.

Figure 4:
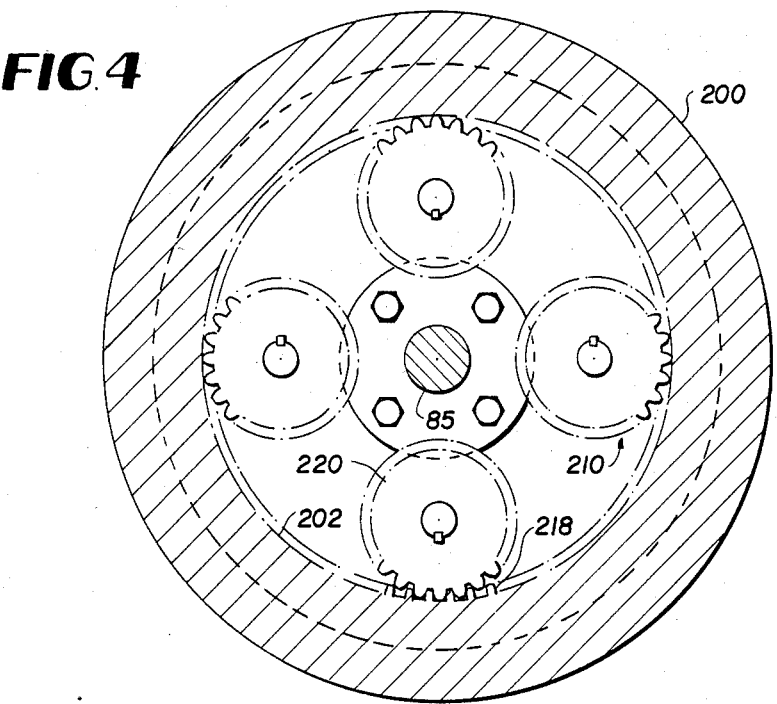
FIG. 4 is a view along the line 4—4 in FIG. 3.

As best seen in FIG. 4, the means 210 cause the subordinate rotors 208 to rotate so that their involute gears 216 accept the chamber dividers 204 as the subordinate rotors 208 move past them. The means 210 comprise an internal gear ring 218 on the inner cylindrical wall of the stator housing 200 and a meshing spur gear 220 coaxially mounted with each subordinate rotor 208 for rotation therewith. Preferably the subordinate rotors 208 and the gears 218 and 220 are sized such that the subordinate rotor 208 make rolling contact with the inner wall of the stator housing 200, thereby minimizing pressure loss past the lines of contact between the subordinate rotors 208 and the inner wall of the stator housing 200.

The stator housing preferably is formed in five parts, a central ringlike portion 222 containing the inlets 212 and the outlets 214, two axial ringlike portions 224 containing internal gear rings 218, and two end plates 226. As shown, the unit is preferably bolted together by bolts 228 passing through clearance holes in the end plates 226 and the axial ringlike portions 224 and threading into the central portion 222. Internal dividers are provided between the central portion 222 and the axial portion 224 to define the axial limits of the working chamber 202.

In use, fluid (in the preferred embodiment, oxidized methyl alcohol, optionally mixed with oxidized hydrogen gas) is pressured simultaneously into all the inlets 212. Referring now specifically to FIG. 5 it will be noted that, in the position of the engine shown in that figure, the pressurized fluid in the working chamber 230 at the upper left has no tendency to cause rotation of the principal rotor 206 because the counter-clockwise force on the left-hand subordinate rotor 208 is exactly balanced by the clockwise force on the upper subordinate rotor 208. Pressurized fluid in the working chamber 232 is exhausting and provides a negligible clockwise force on the adjacent subordinate rotor 208. However, the pressurized fluid in the working chamber 234 at the lower left acts in the counter-clockwise direction on the lower subordinate rotor 208, but it acts in the clockwise direction on the adjacent chamber divider 204, which is carried statically by the stator housing 200. Accordingly, there is a net counterclockwise rotary force on the principal rotor 206 from the working chamber 234. Turning to the working chamber 236 at the lower right, pressurized fluid acts in the clockwise direction against the lower subordinate rotor 208 and in a counterclockwise direction against the adjacent chamber divider 204. However, the working chamber 236 is exhausting through the adjacent outlet 214, so the net clockwise rotary force on the principal rotor 206 for the working chamber 234 is far smaller than the net counterclockwise rotary force on the principal rotor 206 from the working chamber 234. Turning next to the working chamber 230 it will be noted that pressurized fluid is acting in the clockwise direction on the adjacent chamber divider 204 and in the counterclockwise direction on the right-hand subordinate rotor 208, providing a second source of net counterclockwise rotary force on the principal rotor 200. Finally, pressurized fluid in the working chamber 240 at the upper right is exhausting through the adjacent outlet 214. Moreover, since the clockwise force on the subordinate rotor 208 at the right is exactly (but for edge effects) balanced by the counterclockwise force on the subordinate rotor 208 at the top, the net contribution of the working chamber 240, like that of the working chamber 230, is effectively zero in any event.

As will be readily appreciated, while it is the working chambers 234 and 238 which are driving the principal rotor 206 at the instant depicted in FIG. 5, the driving movement will rotate around the periphery of the principal rotor 206 in a fashion very analogous to the power and exhaust cycle of conventional linear cylinders spaced around a drive shaft. Moreover, as will also be readily appreciated, the power from the principal rotor 206 is readily taken off via shafts 85 and 87 in the fashion of rotary motor generally. Finally, it should also be obvious that, like most rotary motors, this one may be operated as a pump as well as a motor.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. An apparatus for burning a mixture of methyl alcohol vapor and steam with near stoichiometric quantities of air, said apparatus comprising:
    a primary combustion chamber wherein said methyl alcohol vapor is partially oxidized;
    steam introduction means operably connected to said primary combustion chamber for supplying sufficient steam to said combustion chamber to maintain said combustion chamber at a temperature of between 1500° F. and 2000° F.;
    a secondary combustion chamber into which the residual fuel not burned in the primary combustion chamber is passed and which contains a fluidized bed of an oxidized stainless steel powder which effects a further oxidation of the fuel;
    a gas expander positioned relative to said secondary combustion chamber such that exhaust gases from said secondary combustion chamber may be pressured into said expander;
    power take-off shafts operably connected to said gas expander and driven by said gas expander;
    cooling means extending from said gas expander into which exhaust gases from said gas expander are passed and cooled sufficiently to condensate a portion of said steam;
    condensate recovery means positioned relative to said cooling means to collect said condensed steam;
    heating means connected to said condensate recovery means and into which a portion of said condensed steam is passed and converted to steam; and
    recycle means connected to said heating means and to said primary combustion chamber for directing a portion of said steam recovered from said heating means into said primary combustion chamber.

2. Apparatus as recited in claim 1 and further comprising: means for recovering exhaust gas heat via indirect heat exchangers to preheat the incoming fuel, recycle water, and air.

3. Apparatus as recited in claim 1 and further comprising means for controlling the temperature of the gases entering the gas expander to maintain them between 1200° F. and 1800° F.

4. Apparatus as recited in claim 1 wherein said oxidized stainless steel powder contains from 1 to 35% nickel and from 1 to 25% chromium.

5. Apparatus as recited in claim 1 and further comprising means for using hydrogen gas fuel to pressure the methyl alcohol fuel into said primary combustion chamber during normal operation but to use the hydrogen also as the fuel for fast start-up and for smooth idling operation.

* * * * *